US011796083B1

(12) United States Patent
Yates et al.

(10) Patent No.: US 11,796,083 B1
(45) Date of Patent: Oct. 24, 2023

(54) MANUFACTURING VALVE TRIM TO ABATE NOISE

(71) Applicant: Dresser, LLC, Houston, TX (US)

(72) Inventors: Chad Eric Yates, Houston, TX (US); Rohan N. Buntval, Houston, TX (US); Stephen Randall Farmer, Orange Park, FL (US); Donald Stroman Sanders, Atlanta, GA (US); Jeremy Asher Glaun, Sharon, MA (US); Mikhail Anisimov, Houston, TX (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/888,542

(22) Filed: Aug. 16, 2022

(51) Int. Cl.
*F16K 47/08* (2006.01)
*F16K 1/32* (2006.01)
*F16K 47/04* (2006.01)

(52) U.S. Cl.
CPC ............... *F16K 47/08* (2013.01); *F16K 1/32* (2013.01); *F16K 47/04* (2013.01); *Y10T 137/86734* (2015.04); *Y10T 137/86751* (2015.04)

(58) Field of Classification Search
CPC . F16K 47/08; F16K 1/32; F16K 47/04; Y10T 137/86734; Y10T 137/86751
See application file for complete search history.

(56) References Cited

U.S. PATENT DOCUMENTS

| | | | | |
|---|---|---|---|---|
| 3,780,767 A * | 12/1973 | Borg | ...................... | F16K 47/08 137/625.37 |
| 5,769,388 A * | 6/1998 | Welker | .................... | F16K 47/08 251/118 |
| 6,701,957 B2 * | 3/2004 | McCarty | ................. | F16K 47/04 137/625.3 |
| 6,782,920 B2 * | 8/2004 | Steinke | .................. | F16K 47/08 137/625.3 |
| 9,115,824 B2 * | 8/2015 | Cazcarra Pallaruelo | ..................... | F16K 3/246 |
| 9,624,748 B2 * | 4/2017 | Gnanavelu | ............ | E21B 33/076 |
| 9,650,862 B2 * | 5/2017 | Husveg | .................... | E21B 34/02 |
| 9,943,784 B2 * | 4/2018 | Kirk | ...................... | B05B 1/3405 |
| 10,302,224 B2 * | 5/2019 | Kluz | ....................... | F16K 47/08 |
| 10,458,555 B2 * | 10/2019 | McCarty | ................. | F16K 47/08 |
| 11,492,872 B2 * | 11/2022 | Giove | ..................... | F16K 47/06 |
| 2010/0300542 A1 * | 12/2010 | Haines | ................... | F16K 47/08 137/1 |

OTHER PUBLICATIONS

Baker Hughes Company, Masoneilan 4900 Series Energy Management Control Valve Instruction Manual (Rev. D), 2020.

* cited by examiner

*Primary Examiner* — Craig M Schneider
*Assistant Examiner* — Christopher D Ballman
(74) *Attorney, Agent, or Firm* — Paul Frank + Collins P.C.

(57) ABSTRACT

A valve trim that is configured to abate noise in a control valve. These configurations may include a cage with a flow path that has a spiral design or layout. This flow path can direct flow around a central bore. A plug may reside in this bore. This plug can travel longitudinally to change parameters of flow through the control valve. In one implementation, the spiral design can split flow inside of the cage. This feature can elongate travel of flow without any increase in dimensions of the cage (or the valve trim itself).

19 Claims, 5 Drawing Sheets

MANUFACTURING VALVE TRIM TO ABATE NOISE

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. It is common in these facilitates for flow controls, like control valves, to generate significant noise in service because of changes in pressure that occur as the flow transits across the device. This aerodynamic noise can reach well above 100 dba or, at least, exceed set limits that are necessary to provide a safe working environment for technicians and other workers at the facility.

SUMMARY

The subject matter of this disclosure relates to improvements to valve manufacture or construction that can attenuate this noise to safe, acceptable levels. Of particular interests are embodiments that direct flow through tortuous flow paths. These embodiments force pressure drop gradually within parts of the valve device. This feature can maintain velocity of fluid at levels that are reasonable, but at noise levels that are well-within specifications or standards.

DRAWINGS

Figure 1:
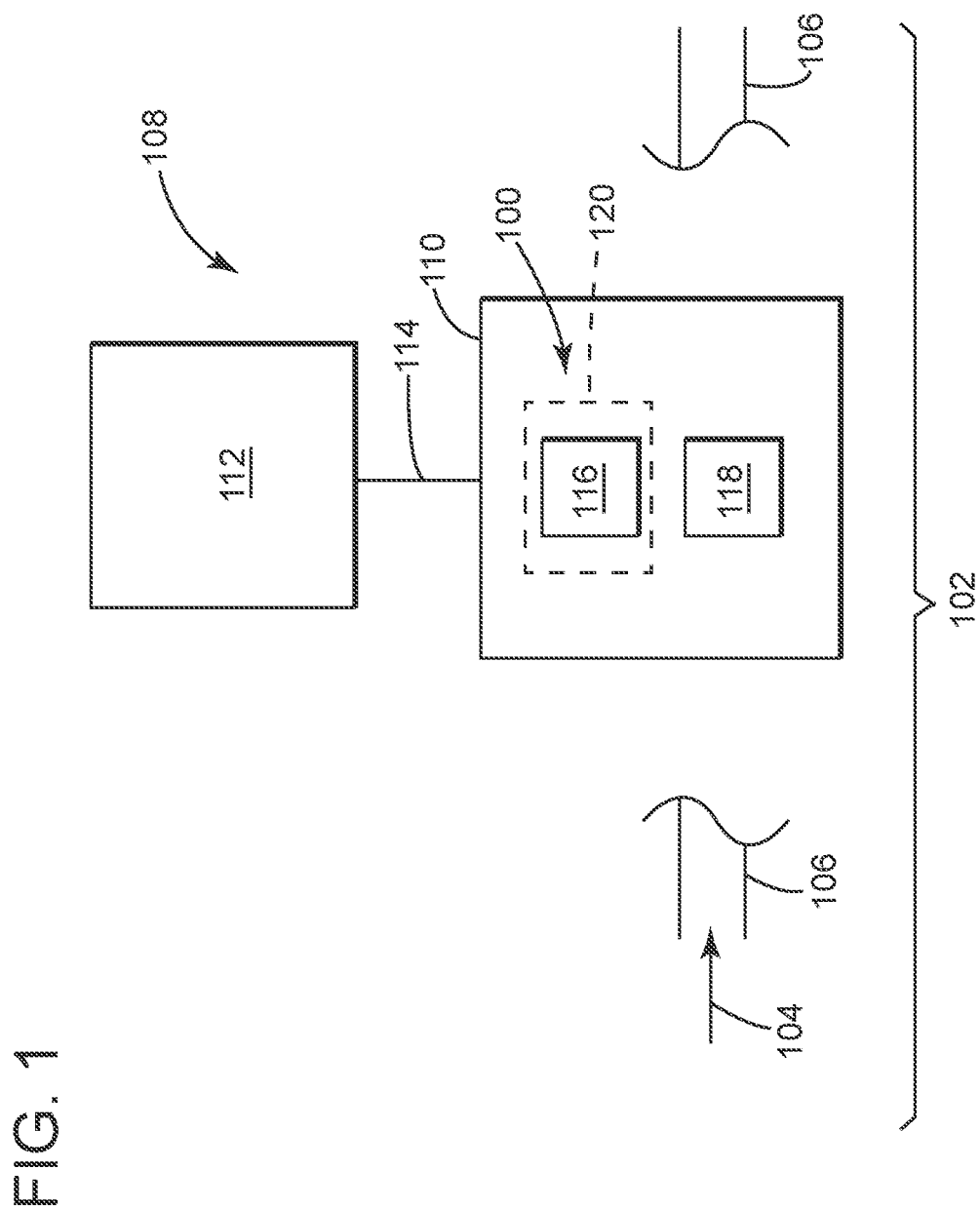
Figure 2:
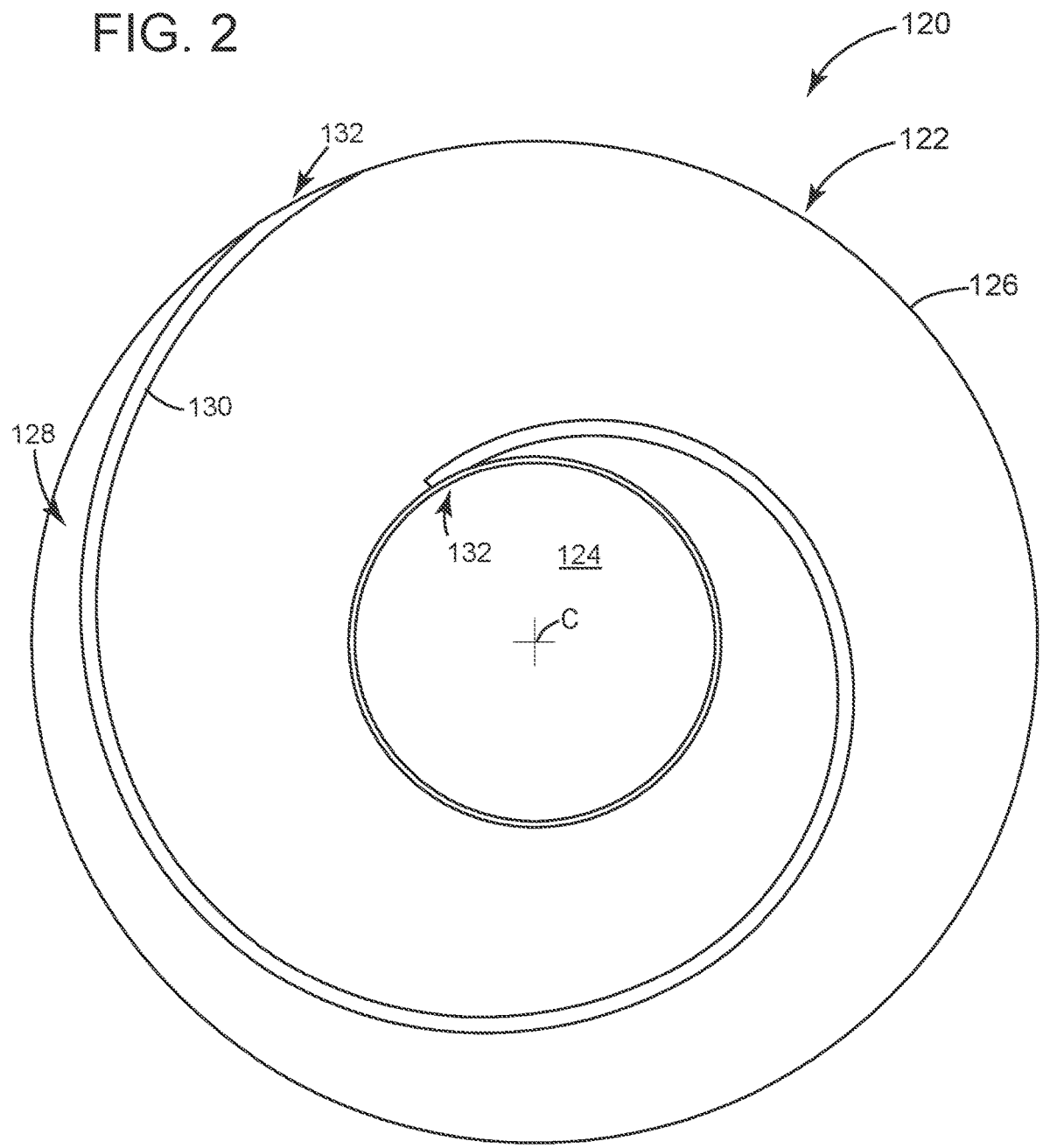
Figure 3:
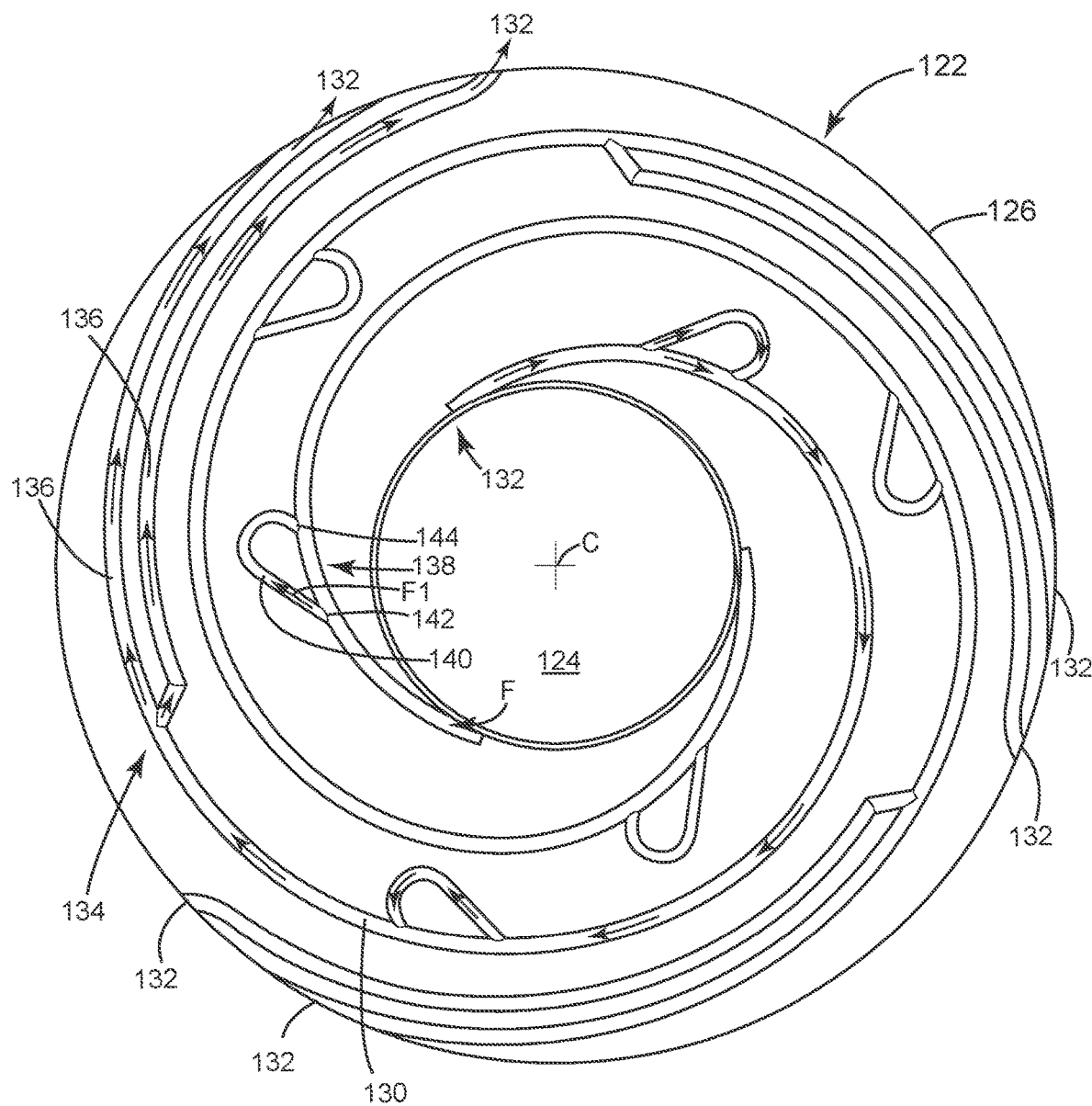
Figure 4:
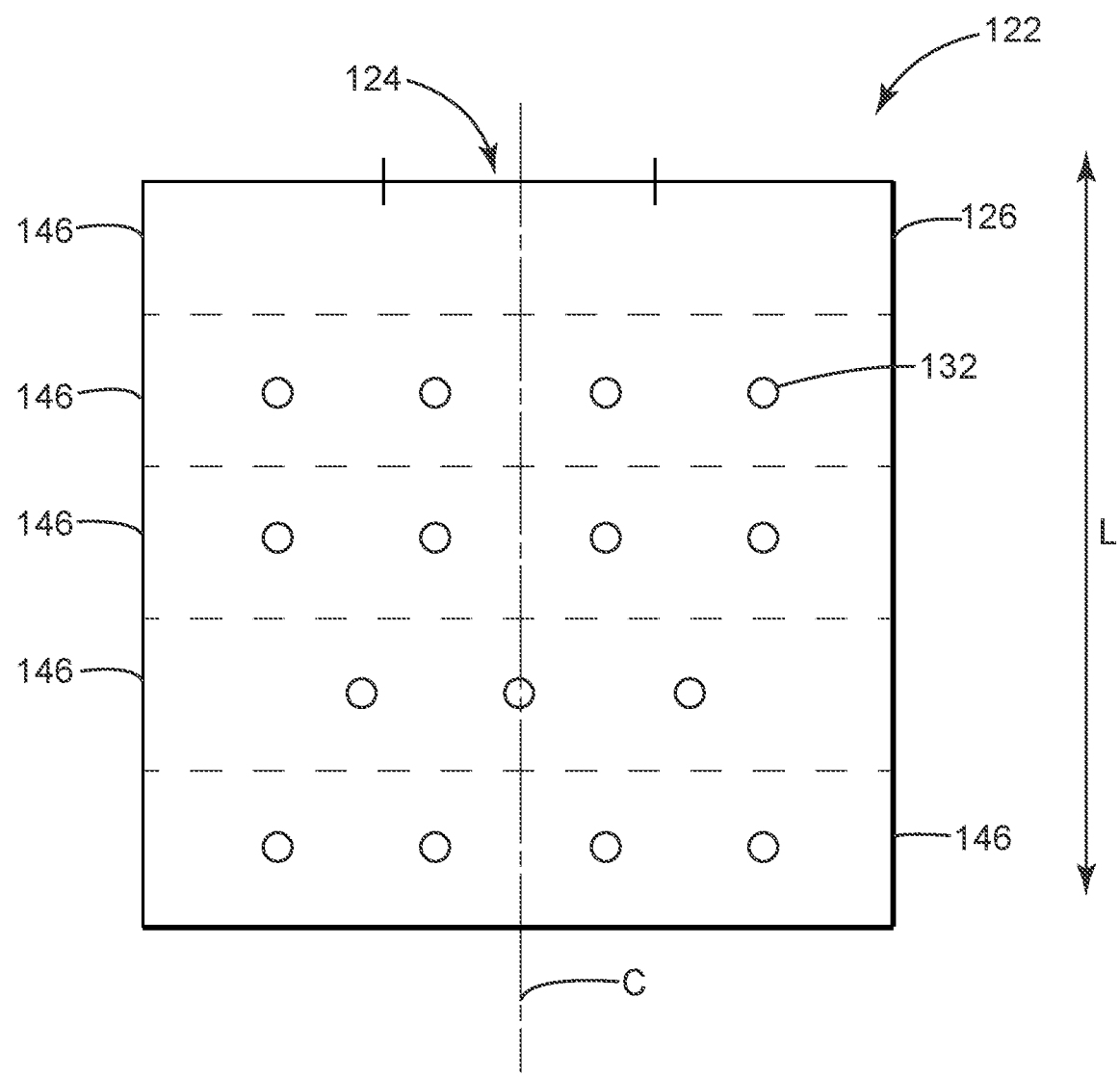
Figure 5:
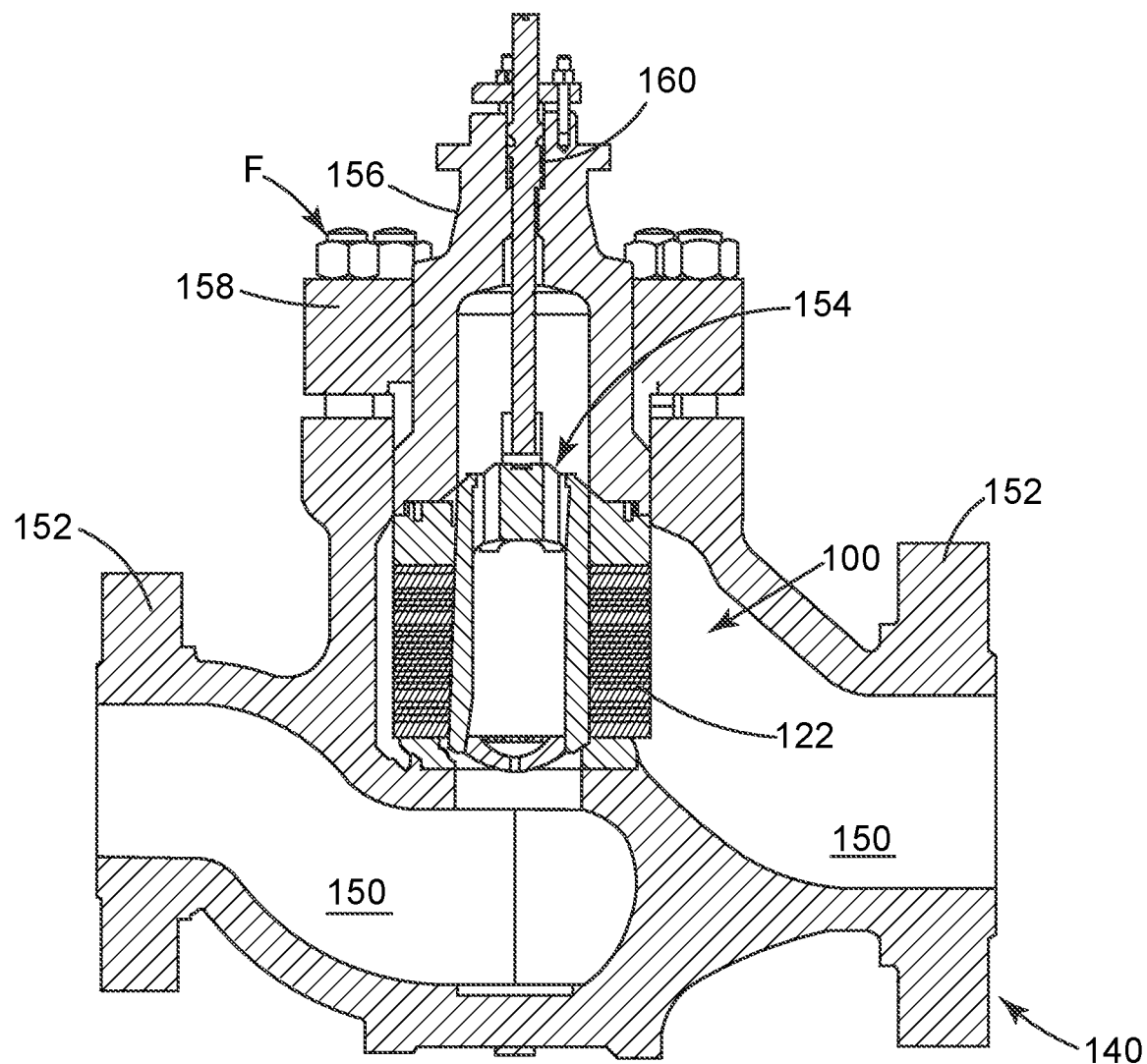

This specification refers to the following drawings:
FIG. 1 depicts a schematic diagram of a valve trim;
FIG. 2 depicts a schematic diagram of a plan view of the cross-section of a part of the valve trim of FIG. 1;
FIG. 3 depicts a plan view of the cross-section of an example of the part of FIG. 2;
FIG. 4 depicts an elevation view of an example of the part of FIG. 2; and
FIG. 5 depicts an elevation view of the cross-section of a flow control.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in drawings noted above. These examples aim to abate noise in industrial or commercial valves. This noise is cause for concern because, left unmitigated, it can create unsafe or even hazardous work areas for operators or technicians. The designs proposed herein may implement tortuous pathways to quiet valves in the field. These pathways maximize the percentage of total pressure drop that shearing action and boundary layer turbulence induce in flowing fluids. Other embodiments are within the scope of this disclosure.

FIG. 1 depicts an example of a trim 100. This example is found in a distribution network 102, typically designed to carry material 104 through a network of conduit 106. The trim 100 may be part of a flow control 108 that has a valve body 110 to connect in-line with the conduit 106. The device may also have actuator 112. A valve stem 114 may extend from the actuator 112 to locate a closure member 116 in position proximate a seat 118. In one implementation, the trim 100 may include a cage 120 that receives the closure member 116 therein.

Broadly, the trim 100 may be configured to attenuate noise. These configurations may incorporate parts that can address sources of noise in the device. These parts may, for example, have structure that changes direction of flow, often as the flow moves radially through the part from inside to outside. This structure may adopt geometry that lends itself to use of additive manufacturing because of complex curves, bends, or other features that are not amendable to traditional machining technology.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 in such devices is often made of cast or machined metals. This structure may form a flange at openings I, O. Adjacent pipes 106 may connect to these flanges. The actuator 112 may use compressed or pressurized air and, along with a piston, spring (or springs), or a flexible diaphragm, generate a load. The valve stem 114 may form an elongate cylinder or rod that directs this load to the closure member 116, which is often a cylindrical block or plug. The load can manage position of the plug to prevent flow through an opening in the seat 118.

The cage 120 may be configured to reside in proximity to the seat 118. These configurations may include designs that are "porous" or allow material to flow from inside to outside the device. This feature may facilitate pressure drop because of tortuous or winding paths that direct fluid in various directions within material of the cage 120. These paths mitigate or attenuate noise. As noted, the designs herein maximize length of the paths without unnecessary increase in dimensions of the cage 120.

FIG. 2 depicts a schematic diagram of a plan view for a cross-section of exemplary structure for the cage 120. This structure may embody a cylinder 122 with a body having a bore 124 with a center axis C. The body may also have an outer surface 126. A flow structure 128 may populate the body. Configurations of the flow structure 128 may pass a flow F of material 104 through one or more tortuous or winding paths. These paths may include a flow pathway 130 that extends through the body and, for example, terminates at openings 132, one each found at the bore 124 and the outer surface 126. The flow pathway 130 may have a cross-section that is round; however other cross-sections, like square or rectangular, may prevail as well. Its surface may be textured, for example, with bumps or stippling. This texture may be configured to add friction or drag to flow F. Along its length, the flow pathway 130 may assume geometry with a design or layout that dissipates pressure of flow F. This design may elongate or maximize travel of material 104 through the body. This feature can induce a pressure drop to reduce noise, for example, as flow F exits the cylinder 122 at the opening 132 on the outer surface 126. One design may cause the pathways 130 to wind in a continuous or gradually widening curve that at least partially circumscribes the bore 124. This curved design or "spiral" layout may follow a radius R that increases concomitantly with angular position a, both being measured from or about the center axis C. A benefit of the spiral design is to achieve adequate pressure drop within set dimensions for the cylinder 122, namely, its outer diameter to keep the overall dimensions of the flow control 108 within design specifications.

FIG. 3 depicts a plan view of the cross-section for exemplary structure of the cylinder 122. The flow pathways 130 may incorporate a junction 134. This feature can increase length of the pressure-dissipating structure because it splits flow from the "interior" opening 132 at the bore 124 into one or more branches 136. Each of the branches 136 may terminate at separate "exterior" openings 132 at the outer surface 126. In one implementation, the flow pathways 130 may include a valve 138 that can contribute to pressure drop. The valve 138 may include a loop 140 with an inlet 142 and an outlet 144. The loop 140 may receive part of flow F from the branches 136 at the inlet 142. This part may form subsidiary flow $F_1$. Geometry for the loop 140 may direct subsidiary flow $F_1$ back into the branch 136 at the outlet 144. In one implementation, subsidiary flow $F_1$ flows in a direction that is opposite or at an angle to flow F. This feature can interrupt flow F in a manner that further reduces velocity or flow rate and, in turn, facilitates pressure drop that can reduce noise as flow F exits the pathways 132 at the openings 130 at the outer surface 126.

FIG. 4 depicts an elevation view of an example of the cylinder 122. The body has a length L that includes several flow-dissipating sections 146. Each of the sections 146 may incorporate the flow structure 128, with openings 132 that populate the outer surface 126. In one implementation, additive manufacturing techniques (or 3-D printing) may help to manufacture or embed tortuous paths (or flow pathways 130 with the spiral layout) or other complex geometry in each section 146. These techniques are also useful to manufacture the sections 146 together so that the body of the cylinder 122 forms a unitary or monolithic device. In other implementations, the sections 146 may form individual "plates" that stack on top of one another. This collective stack can form the cylinder 122. However, this disclosure recognizes that use of additive techniques can avoid the need to stack "plates," and thus offers a better solution because it costs less, is less complex, or provides other benefits over the stacked plate design.

FIG. 5 depicts an elevation view from the side showing exemplary structure for the trim 100. The cylinder 122 may reside in a casing 148 made of metal (or material with suitable properties). The casing 148 may have flow paths 150 that terminate at flanged openings 152. The flow paths 150 may receive material 104 from adjacent conduit 106 that attach to the casing at the flanged openings 152. The closure member 116 may embody a moveable plug 154 that resides in bore 124 of the cylinder 122. The valve body 110 may include a bonnet 156 that inserts into the casing 148. A bonnet flange 158 may couple with the casing 148, thus securing the bonnet 156 in position. Fasteners F, like nuts and bolts, may work for this purpose. The valve stem 114 may extend through the bonnet 156. In one implementation, packing 160 may fit over the valve stem 114. The packing 160 is useful to allow movement of the valve stem 114, but prevent the flow control 108 from emitting fugitive emissions.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A valve, comprising:
    valve trim comprising a cage with a bore forming an axis, the cage incorporating a flow pathway comprising a branch following a pattern with a radius that increases concomitantly with angular position about the axis, the flow pathway further comprising a loop having an inlet disposed on the branch and an outlet disposed on the branch,
    wherein the loop creates a subsidiary flow that re-enters the branch through the outlet in a direction that is at an angle to flow in the flow pathway.

2. The valve of claim 1, wherein the pattern forms a spiral.

3. The valve of claim 1, wherein the flow pathway has an opening at the bore.

4. The valve of claim 1, wherein the flow pathway has an opening on an outer surface of the cage.

5. The valve of claim 1, wherein the flow pathway is configured to allow flow through the cage.

6. The valve of claim 1, wherein the flow pathway forms branches that terminate at different openings on an outer surface of the cage.

7. The valve of claim 1, wherein the flow pathway splits flow into two separate exiting streams.

8. The valve of claim 1, wherein the flow pathway has a junction that splits flow into two different branches inside of the cage.

9. The valve of claim 1, wherein the cage has a monolithic structure.

10. A valve, comprising:
    a cage with a bore;
    a closure member moveable in the bore; and
    a seat stationary relative to the cage,
    wherein the cage has a body that directs fluid through a flow pathway comprising a branch that follows a pattern with a radius that increases concomitantly with angular position about the bore, the flow pathway further comprising a loop having an inlet disposed on the branch and an outlet disposed on the branch,
    wherein the loop creates a subsidiary flow that re-enters the branch through the outlet in a direction that is at an angle to flow in the flow pathway.

11. The valve of claim 10, wherein the body has at least two flow-dissipating sections, each having at least one of the flow pathway.

12. The valve of claim 10, wherein the body has at least two flow-dissipating sections, each having at least one of the flow pathway and each spaced longitudinally from one another along the bore.

13. The valve of claim 10, wherein the body forms a cylinder with a monolithic structure.

14. The valve of claim 10, wherein the body has a monolithic structure with at least two flow-dissipating sections, each having at least one of the flow pathway.

15. The valve of claim 10, wherein the body has a monolithic structure with at least two flow-dissipating sections, each having at least one of the flow pathway and each spaced longitudinally from one another along the bore.

16. A valve, comprising:
   valve trim the directs flow through a flow pathway comprising a branch that is in a spiral pattern from inside to outside, the flow pathway further comprising a loop with an inlet disposed on the branch and an outlet disposed on the branch,
   wherein the loop creates a subsidiary flow that re-enters the branch through the outlet in a direction that is at an angle to flow in the flow pathway.

17. The valve of claim 16, further comprising:
   a plurality of flow pathways that adopt the spiral pattern.

18. The valve of claim 16, further comprising:
   a plurality of flow pathways that adopt the spiral pattern, the plurality of flow pathways spaced longitudinally apart from one another along an axis of the valve trim.

19. The valve of claim 16, further comprising:
   a plurality of flow pathways that adopt the spiral pattern, each of the plurality of flow pathways splitting flow within the valve trim.

* * * * *